United States Patent
Wirth, Jr. et al.

[11] Patent Number: 5,882,151
[45] Date of Patent: Mar. 16, 1999

[54] DEPTH STOP FOR A BORING TOOL

[75] Inventors: John Wirth, Jr.; Jay L. Sanger; Paul Brutsman, all of Casper, Wyo.

[73] Assignee: Woodworkers Supply, Inc., Casper, Wyo.

[21] Appl. No.: 863,394

[22] Filed: May 27, 1997

[51] Int. Cl.[6] .................................................. B23B 39/00
[52] U.S. Cl. ............................. 408/110; 408/14; 408/202
[58] Field of Search ............................ 408/14, 110, 113, 408/202, 241 S

[56] References Cited

U.S. PATENT DOCUMENTS

| | | | |
|---|---|---|---|
| 2,216,988 | 10/1940 | Schmidt | 408/113 |
| 2,402,353 | 6/1946 | Trautmann | 408/202 |
| 2,477,891 | 8/1949 | O'Neill | 408/113 |
| 2,554,770 | 5/1951 | Ashton | 408/113 |
| 2,915,925 | 12/1959 | Nipken | 408/113 |
| 3,017,643 | 1/1962 | Lehde | 408/202 |
| 4,019,827 | 4/1977 | Christianson et al. | 408/202 |

FOREIGN PATENT DOCUMENTS 2624734  12/1977  Germany ................................ 408/14

*Primary Examiner*—Daniel W. Howell
*Assistant Examiner*—Adesh Bhargava
*Attorney, Agent, or Firm*—Pillsbury Madison & Sutro, LLP

[57] ABSTRACT

A boring tool includes a depth stop for regulating cutting depth of the boring tool. The boring tool has a shank and an elongated cutting head. The depth stop includes a sleeve body which is selectively, detachably fixed to a shank of the boring tool by a sleeve body attaching mechanism and a cutting depth regulating structure that is rotatably mounted to the sleeve body. A depth stop for regulating cutting depth of a rotary cutting tool having an axis of rotation includes a cutting depth regulating structure having circumferentially spaced, radially extending tines including a portion extending substantially in parallel to the axis of rotation and may be selectively, detachably fixed to the rotary cutting tool by a collet.

42 Claims, 3 Drawing Sheets

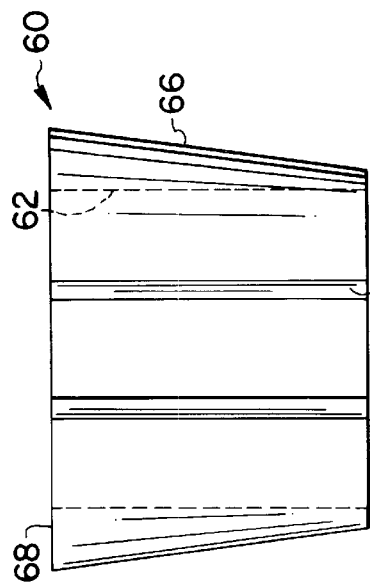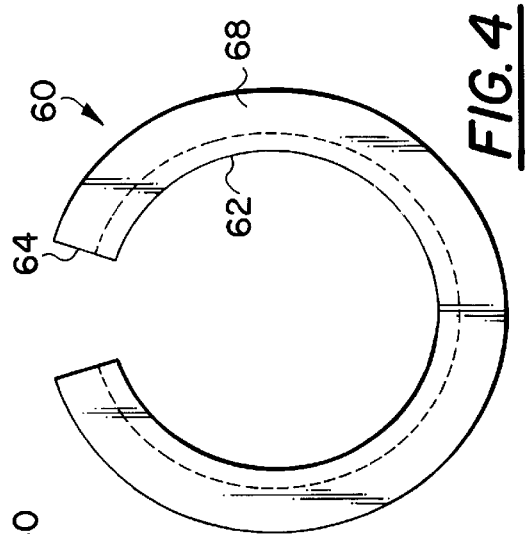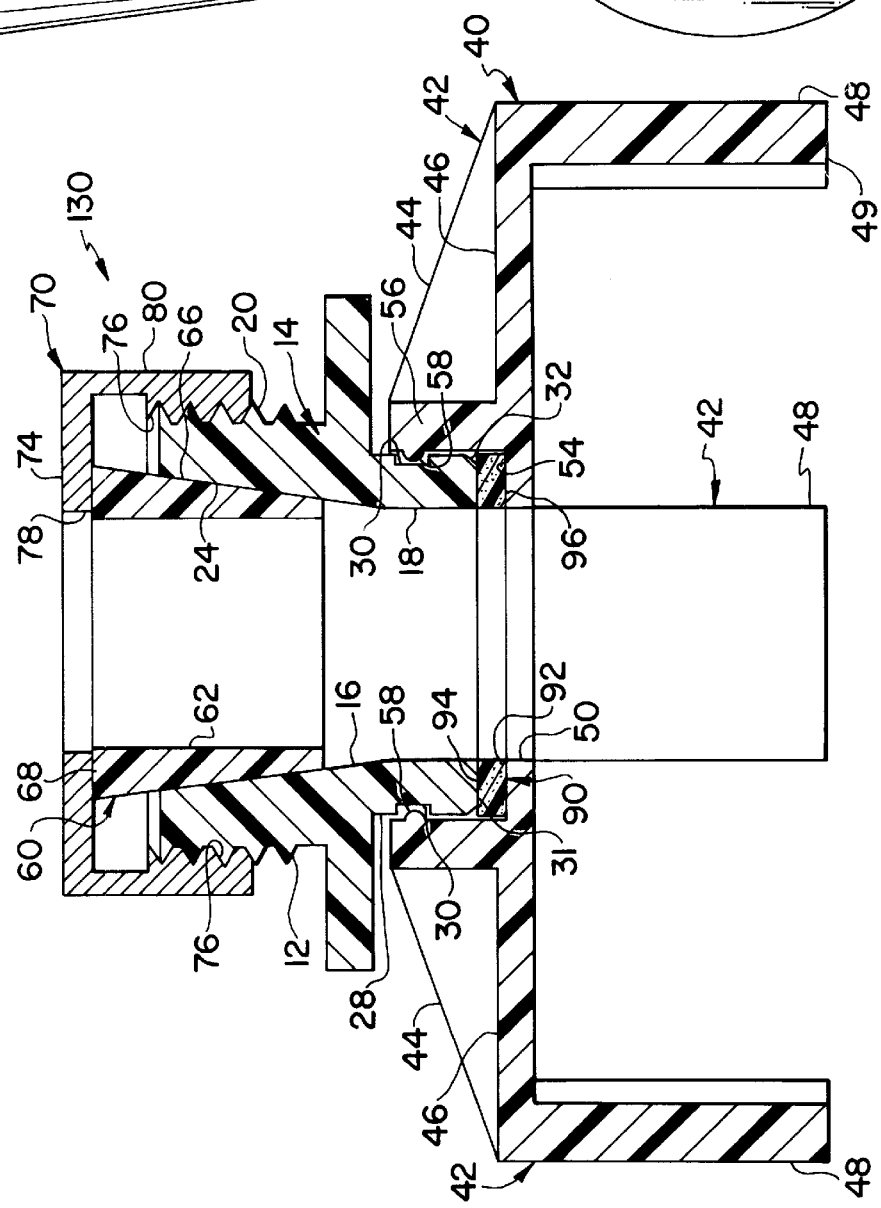

DEPTH STOP FOR A BORING TOOL

BACKGROUND OF THE INVENTION

1. Field of the Invention

The present invention relates to an improved depth stop, removably attachable to a rotary cutting tool and particularly to a boring tool with an enlarged cutting head.

2. Description of the Related Art

Depth stops facilitate precision drilling by regulating the depth to which a drilling tool penetrates a work piece to an operator-selected distance. A typical depth stop includes a body that slips over a drilling tool and is removably attachable to the drilling tool, for example, by a set screw extending through the body. The stop is secured to the drilling tool at a selected position which defines the depth to which the drilling tool can penetrate a work piece. Once the stop comes into contact with the work piece, the tool can penetrate no further into the work piece. Because the stop is typically fixed to the drilling tool so that it can not rotate with respect thereto, the stop continues to rotate with the tool when it comes into contact with the work piece, thus marring the surface of the work piece. Marring is minimized if the portion of the stop that comes into contact with the work piece is rotatable with respect to the body of the depth stop so that when that portion comes into contact with the work piece, it stops rotating as the body and drilling tool continue to rotate.

Depth stops for drilling tools having rotatable contact structures are known in the art. Drilling tools such as drill bits, however, typically have a constant diameter along their length, at least for the portion of the drilling tool at which a depth stop would be attached. Certain boring tools, such as, for example, Forstner bits or multi-tip spur bits, have a substantially different structure as compared with conventional drill bits. Such bits may have an elongated, constant diameter shank portion, one end of which is inserted into and held by the chuck of a drilling machine. A cutting head located at the opposite end of the shank is a generally cylindrical structure of constant diameter, typically larger than the diameter of the shank. The cutting head may have radially and circumferentially extending cutting blades at its free end. The cutting head is also typically relatively short in axial length, and, therefore, attaching a depth stop thereto can be problematic.

Proficiency of the depth stop can be impaired by the presence of drilling debris around the hole being cut by the rotary cutting tool. Such debris can prevent the depth stop from contacting the surface of the work piece being cut, thus causing the depth of the hole regulated by the depth stop to be inaccurate. U.S. Pat. No. 3,000,239 proposes a depth stop structure comprising two diametrically opposed axially extending legs, the bottom ends of which contact the work piece to arrest advancement of the cutting tool into the work piece. Although debris may escape from between the legs, the device proposed in the '239 patent is merely sandwiched between an annular shoulder of the cutting tool and the chuck of the drilling machine; the device cannot be selectively fixed at a desired axial position along the cutting tool. Moreover, with only two diametrically opposed legs, the device is inherently unstable in the lateral direction.

In addition, fixing the non-rotating portion of the depth stop to the cutting tool by means of set screws extending radially into a body of the depth stop presents certain disadvantages. Installing, adjusting, and removing the depth stop is cumbersome and time consuming because of the need to tighten and loosen the set screw or set screws. Moreover, the set screw itself requires an additional tool, such as a screw driver or allen wrench. Also, a set screw tightened against a cutting tool can mar the tool itself, especially if the depth stop turns with respect to the cutting tool while the set screw is tightened against the tool. If the set screw is tightened against the cutting blades of a drill bit, the resulting marring of the blades by the set screw can impair performance of the drill bit.

SUMMARY OF THE INVENTION

It is an object of the present invention to address the concerns noted above while avoiding the disadvantages of the prior art.

This and other objects are achieved by providing a depth stop for selective attachment to a rotary cutting tool, having a cutting tip and an axis of rotation, to regulate cutting depth of the cutting tip. The depth stop comprises a sleeve body having an aperture defined axially therethrough for selectively receiving the rotary cutting tool and a sleeve body attaching mechanism operatively associated with the sleeve body and constructed and arranged to selectively detachably fix the sleeve body to the rotary cutting tool at a selected longitudinal position along the rotary cutting tool so that the sleeve body is not rotatable with respect to the rotary cutting tool.

A cutting depth regulating structure is operatively associated with the sleeve body and is constructed and arranged to regulate the cutting depth of the cutting tip of the rotary cutting tool to which the depth stop is attached by arresting advancement of the rotary cutting tool into a work piece when the cutting depth regulating structure contacts the work piece. The cutting depth regulating structure comprises a central hub portion defining a central aperture extending axially therethrough for selectively receiving the rotary cutting tool and a plurality circumferentially spaced tines.

Each of the plurality of tines includes a portion extending substantially in parallel to the axis of rotation, toward the cutting tip of the rotary cutting tool.

The objects are further achieved by providing a depth stop for selective attachment to a rotary cutting tool having an axis of rotation to regulate cutting depth of the rotary cutting tool. The depth stop comprises a sleeve body having an aperture defined axially therethrough for selectively receiving the rotary cutting tool. A collet apparatus is operatively engagable with the sleeve body to selectively detachably fix the sleeve body to the rotary cutting tool at a selected longitudinal position along the rotary cutting tool so that the sleeve body is not rotatable with respect to the rotary cutting tool. A cutting depth regulating structure is operatively associated with the sleeve body and is constructed and arranged to regulate the cutting depth of the rotary cutting tool to which the depth stop is attached by arresting advancement of the rotary cutting tool into a work piece when the cutting depth regulating structure contacts the work piece into which the rotary cutting tool is cutting.

The objects are further achieved by providing a rotary cutting tool adapted to be operatively coupled with a rotary tool turning machine and to form a circular hole of a preselected depth in a work piece when a cutting portion of the rotary cutting tool is engaged with the work piece while being turned by the rotary tool turning machine.

The rotary cutting tool comprises a boring tool having an elongated shank portion with a longitudinal axis of rotation and a circular cutting head disposed at one longitudinal end of the shank portion coaxially with the axis of rotation, the cutting head having an outside diameter larger than an outside diameter of the shank. The shank portion is constructed and arranged to be gripped and rotated by the rotary tool turning machine. The cutting head has cutting blades which cut the circular hole in the work piece when the cutting blades are engaged with the work piece while the boring tool is rotated by the rotary tool turning machine.

A depth stop is provided for selective attachment to the boring tool to regulate cutting depth of the cutting blades to the preselected depth. The depth stop comprises a sleeve body having an aperture defined axially therethrough for selectively receiving the shank portion. A sleeve body attaching mechanism is operatively associated with the sleeve body and is constructed and arranged to selectively detachably fix the sleeve body to the shank portion at a selected longitudinal position along the shank portion so that the sleeve body is not rotatable with respect to the boring tool.

A cutting depth regulating structure is operatively associated with the sleeve body and is constructed and arranged to regulate the cutting depth of the cutting blades by arresting advancement of the cutting head into the work piece when the cutting depth regulating structure contacts the work piece into which the boring tool is cutting the circular hole. The cutting depth regulating structure has a central aperture defined axially therethrough for selectively receiving the shank portion and is rotatably coupled with the sleeve body so as to be rotatable with respect to the sleeve body about the axis of rotation so that when the cutting depth regulating structure contacts the work piece while the boring tool is being rotated by the rotary tool turning machine, the cutting depth regulating structure, in frictional contact with the surface of the work piece, stops rotating while the sleeve body and the boring tool continue to rotate with the rotary tool turning machine.

Other objects, features, and characteristics of the present invention will become apparent upon consideration of the following description and the appended claims with reference to the accompanying drawings, all of which form a part of the specification, and wherein like reference numerals designate corresponding parts in the various figures.

DESCRIPTION OF THE DRAWINGS

FIG. 3 is a cross-sectional view of a depth stop according to the present invention taken along the line 2—2 in FIG. 1, but with the rotary cutting tool removed for clarity;

FIG. 4 is a top view of a collet sleeve used in the depth stop of the present invention; and FIG. 5 is an elevation of the collet sleeve shown in FIG. 4.

DESCRIPTION OF PRESENTLY PREFERRED EXEMPLARY EMBODIMENT

Figure 1:
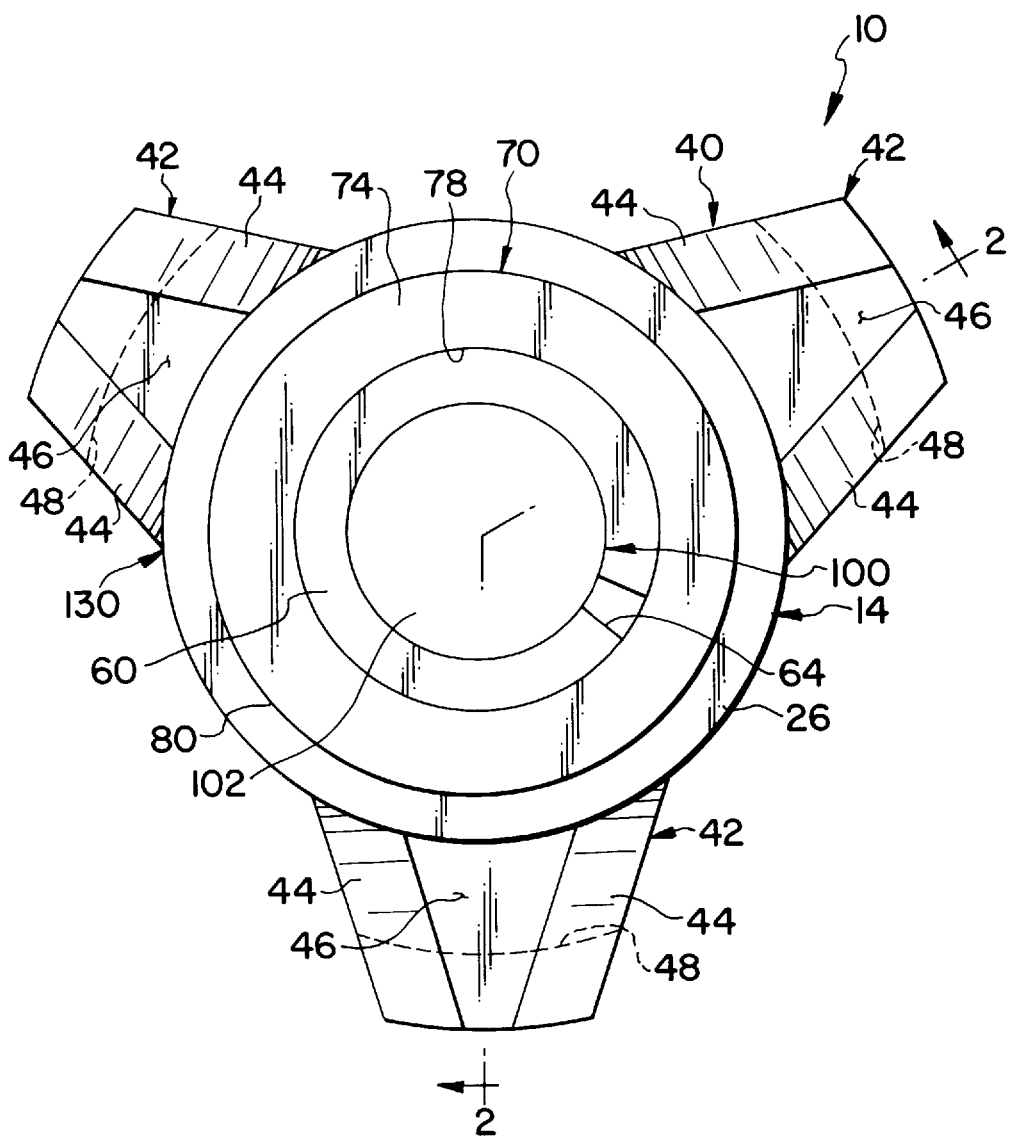
FIG. 1 is a top view of a depth stop according to the present invention attached to the shank of a rotary cutting tool.

For convenience in the following description, various directional or other spatial references are made in regard to the orientation of the structure(s) as illustrated in the drawings. It should be understood, however, that such references, including without limitation, upper, lower, top, bottom, left, right, horizontal, vertical, lateral, or longitudinal, are made for purposes of convenience and should not be construed to be limiting on the invention described herein.

Figure 2:
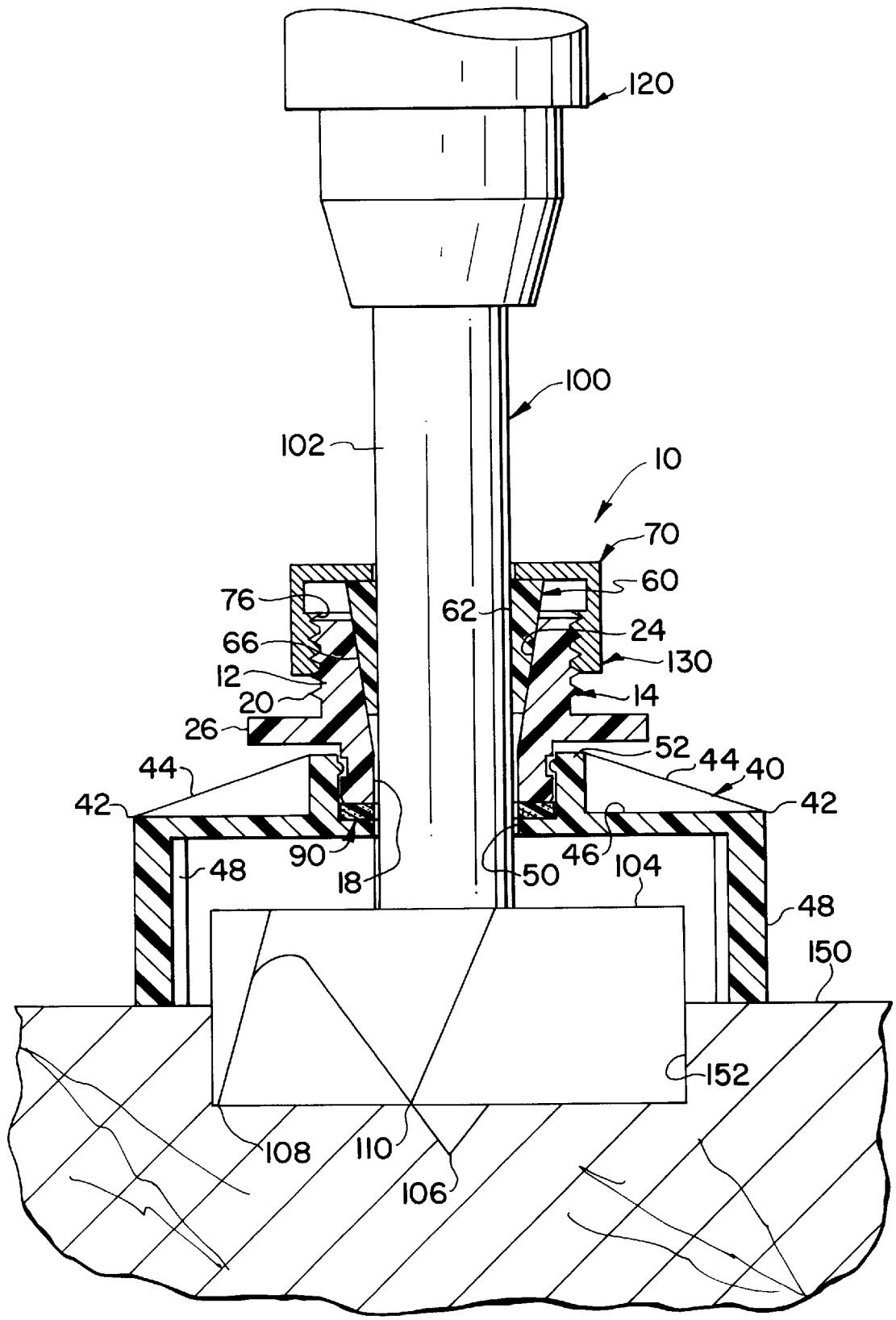
FIG. 2 is a view, partially in cross-section, taken along the line 2—2 in FIG. 1 of a depth stop according to the present invention attached to the shank of a boring tool that is mounted in a drilling machine.

A depth stop 130 according to the present invention attached to the shank 102 of a rotary cutting tool 100 is shown in FIG. 1, the combination of the depth stop 130 and rotary cutting tool 100 being indicated generally by reference number 10. As shown in FIG. 2, the depth stop 130 is attached at a selected axial position along the shank 102 of the cutting tool 100. One end of shank 102 is operatively fixed into a rotary tool turning machine 120, such as a drilling machine or auger, by inserting the shank 102 into a gripping device, such as a collet grip. Shank 102 typically has a diameter of ½ inch.

In the preferred embodiment, the cutting tool 100 is a boring tool having at an end of shank 102 a cutting head 104. Cutting head 104 is typically of a generally cylindrical shape having an axial length considerably shorter than that of shank 102. Exemplary boring tools of this type include multi-tip spur bits and Forstner bits. The cutting head 104 may include a centering point 106, radially extending cutting blades 110, and a circumferentially extending blade 108. As can be appreciated from the embodiment illustrated in FIG. 2, the outside diameter of the cutting head 104 is substantially greater than that of the shank 102.

As the bit 100 is engaged with a work piece 150 while being rotated by the drilling machine 120, the bit 100 cuts a circular hole 152 into the work piece 150. As can be appreciated from FIG. 2, the depth to which the bit 100 cuts into the work piece 150 can be regulated by the position of the depth stop 130.

Depth stop 130 includes a cutting depth regulating structure 40 that is preferably constructed and arranged to be rotatable with respect to the bit 100 in a manner to be described in more detail below. As shown in FIGS. 1, 2, and 3, the cutting depth regulating structure 40 includes a central aperture 50 for receiving the shank 102 of the bit 100 and a plurality of circumferentially spaced tines 42 projecting outwardly from the shank 102. In the illustrated embodiment, three tines are provided, which is preferred because three tines provides lateral stability to the depth stop. Tines 42 extend radially away from shank 102 beyond the outside diameter of cutting head 104 of the bit 100. The tines 42 all preferably extend outwardly the same distance so that when the cutting depth regulating structure 40 is rotated, the endmost portions of the tines 42 trace a circle. At the radial ends of the tines 42, a longitudinally extending portion 48 extending substantially in parallel to the axis of rotation of the bit 100 toward the cutting end of the cutting head 104.

As can be appreciated from FIG. 2, cutting depth regulating structure 40 defines a skirt that encompasses the cutting head 104 of the bit 100.

The longitudinally extending portions 48 of the tines 42 are preferably arcuate in shape, corresponding in radius of curvature to the circle traced by the tines 42.

As shown in FIG. 1, the radially extending portion of each tine is preferably of a truncated wedge shape, the radially outermost portion being narrowest and the radially innermost portion being widest. In addition, as shown in FIGS. 1–3, each tine 42 preferably includes gusset structures 44 extending outwardly along opposite sides of each tine with a relatively flat radially extending center portion 46 defined between the gusset structures 44.

As can be appreciated, the circumferential spacing of the tines provides open areas between adjacent tines which permits drilling debris generated by the bit 100 to escape from between the longitudinally extending portions 48.

Although three tines 42 are preferred to provide stability in all lateral directions, more or less than three tines may be provided, so long as sufficient spacing is allowed between adjacent tines so as to permit the escape of drilling debris. In addition, the tine structure could be replaced by a disk structure having circumferentially spaced longitudinally extending portions extending toward the cutting tip.

As shown in FIGS. 2 and 3, depth stop 130 further includes a main sleeve body 14 being substantially circular in shape and having an axis of rotation that coincides with the axis of rotation of the bit 100. Sleeve body 14 includes a radially extending annular flange 26 which divides the sleeve body 14 into an upper portion 12 and a lower portion 28. A central aperture 24 extends axially through the sleeve body 14 for receiving the shank 102 of the bit 100. Aperture 24 includes a straight cylindrical portion 18 and a tapered portion 16 having a linearly increasing diameter extending away from straight portion 18. Exterior threads 20 are formed about the outer periphery of the upper portion 12 of sleeve body 14.

Cutting depth regulating structure 40 includes an upwardly extending cylindrical wall 56 oriented coaxially with the central aperture 50. Gusset structures 44 of the tines 42 extend radially outwardly from the outer surface of cylindrical wall 56. An annular wall 54 extends radially inwardly from the cylindrical wall 56 and defines aperture 50. As can be appreciated from FIG. 3, the upright cylindrical wall 56 and the radial annular wall 54 define a cup structure which receives the lower portion 28 of the sleeve body 14.

A circumferential groove 30 is formed about the outer periphery of the lower portion 28 of sleeve body 14. Groove 30 receives a circumferential flange 58 extending radially inwardly from an inner surface of upright cylindrical wall 56 of cutting depth regulating structure 40. Flange 58 is preferably rounded in its cross-sectional shape so as to be easily snapped into the groove 30. A bevelled edge 32 is preferably formed at the lower peripheral edge of the sleeve 14 to facilitate insertion of the lower portion 28 of the sleeve 14 past the radial flange 58. Flange 58 is preferably loose fitting within groove 30 so that cutting depth regulating structure 40 is rotatable with respect to sleeve body 14.

Alternatively, an outwardly extending flange could be formed on the lower portion 28 of sleeve body 14 and a mating circumferential groove could be formed on the inner surface of upwardly extending cylindrical wall 56. Although the flange, whether provided on the sleeve body 14 or the cutting depth regulator 40, is preferably a continuous circumferential flange, a discontinuous flange structure could be adopted instead.

Sleeve body 14 is preferably constructed of a teflon polycarbonate blend or nylon. The cutting depth regulating structure 40 is preferably composed of a polymer having a low coefficient of friction, preferably in the range of 0.04 to 0.10, such as nylon, but may also be formed from a teflon polycarbonate blend or any other suitable material.

An annular ring 90 is preferably provided between an annular end face 31 of sleeve body 14 and annular wall 54 of the cutting depth regulating structure 40. Annular ring 90 is preferably a washer having a centrally located aperture 92 and also comprised of a polymer having a low coefficient of friction, preferably in the range of 0.04 to 0.10, such as nylon. Annular ring 90 may also comprise other friction reducing devices, such as a needle thrust bearing.

Annular ring 90 facilitates rotation of the structure 40 with respect to the sleeve body 14 when the depth stop 130 is pressed against the work piece 150. Rotation is facilitated because the amount of friction between lower surface 96 of annular ring 90 and the upper surface of annular wall 54 of the regulating structure 40 is less than the amount of friction between upper surface 94 of the annular ring 90 and annular end wall 31 of the sleeve body 14. The annular ring 90 may bind when there is an axial force applied against the regulating structure 40, but regulating structure 40 will be less likely to bind under such an axial force due to the presence of the annular ring 90.

Best results are achieved if the flange 58 of the regulating structure 40 enjoys a non-interfering fit within the groove 30 of sleeve body 14. Specifically, groove 30 and flange 58 should be sized and configured so that flange 58 does not contact the sides of groove 30 when regulating structure 40 is under an axial thrust force from a work piece 150. All axial bearing force applied against the bottom surface 49 of the regulating structure 40 will be received by annular ring 90 and end surface 31 of sleeve body 14. Alternatively, if no annular ring is provided, the groove 30 and flange 58 should be configured so that annular wall 54 of the regulating structure 40 is in contact with the end surface 31 of sleeve body 14 so that all axial force is absorbed by the end surface 31 of sleeve body 14. If the flange 58 bears against the sides of groove 30 under an axial load, the regulating structure 40 can bind and may not be able to rotate with respect to sleeve body 14, thus marring the work piece when the rotating regulating structure 40 contacts the surface of the work piece.

Depth stop 130 is preferably held in a desired fixed position on shank 102 of the bit 100 by means of a collet which, in the illustrated embodiment, comprises a collet sleeve 60 and a collet cap 70. Details of the construction of the collet sleeve 60 are shown in FIGS. 4 and 5. Sleeve 60 is substantially circular in cross-section with an axial aperture 62 extending therethrough. Aperture 62 is of a constant diameter. Outer surface 66 of the collet sleeve 60 is tapered so that the outside diameter of the collet sleeve increases linearly from one axial end thereof to an opposite axial end thereof. Collet sleeve 60 is discontinuous, a longitudinal slot 64 being formed therein, and is preferably formed from ABS plastic.

Referring again to FIGS. 2 and 3, collet cap 70 includes a radially extending annular wall 74 defining an aperture 78 extending therethrough and an outer axially extending wall 80 extending from annular wall 74. Axially extending wall 80 preferably defines a cylindrical inner periphery with interior threads 76 formed about the inner periphery of axial wall 80. Axial wall 80 is preferably cylindrical in shape, defining an annular cross-section. Alternatively, the outer surface of wall 80 may have straight portions, such as a rectangular or hexagonal profile, for accommodating a wrench.

To detachably fix the depth stop 130 to the shank 102, collet sleeve 60 is inserted coaxially within the aperture 24 of sleeve body 14. The outside diameter of tapered portion 66 of sleeve body 60 is such that sleeve body 60 is snugly received within the angled portion 16 of aperture 24. Aperture 62 extending through collet sleeve 60 is preferably sized so as to provide a slight friction fit between shank 102 and sleeve 60.

Collet cap 70 is placed over the collet sleeve 60 and the interior threads 76 of the collet cap 70 are threaded into the exterior threads 20 of the sleeve body 14. As can be appreciated from FIG. 2, as collet cap 70 is threaded further onto sleeve body 14, the annular radial wall 74 of the collet cap 70, which is in contact with the end of collet sleeve 60, forces the collet sleeve 60 further into the aperture 24 of the sleeve body 14. The interengagment of the tapered surface of portion 16 of aperture 24 and the tapered outer surface 66 of the sleeve body 60 creates a radially inwardly acting force on the collet sleeve 60. Because, however, collet sleeve 60 is discontinuous and has slot 64 formed therein, collet sleeve 60 is permitted to contract circumferentially around the shank 102 of the bit 100. Thus, the depth stop 130 is secured on the shank 102 by the collet structure.

The outer surface of axial wall 80 and the outer peripheral edge of annular flange 26 are preferably knurled or otherwise textured to assist an operator in gripping each surface for turning the collet cap 70 relative to the sleeve body 14 while tightening or loosening the collet.

Alternatively, depth stop 130 could be secured to the shank 102 by means of a set screw extending radially through a collar disposed about the shank 102.

While the invention has been described in connection with what is presently considered to be the most practical and preferred embodiment, it is to be understood that the invention is not to be limited to the disclosed embodiment, but, on the contrary, it is intended to cover various modifications and equivalent arrangements included within the spirit and scope of the appended claims. Thus, it is to be understood that variations in the particular parameters used in defining the depth stop of the present invention can be made without departing from the novel aspects of this invention as defined in the claims.

What is claimed is:

1. A depth stop for selective attachment to a rotary cutting tool, having a cutting tip and an axis of rotation, to regulate cutting depth of the cutting tip, said depth stop comprising:
    a sleeve body having an aperture defined axially therethrough for selectively receiving the rotary cutting tool;
    a sleeve body attaching mechanism operatively associated with said sleeve body and constructed and arranged to selectively detachably fix said sleeve body to the rotary cutting tool at a selected longitudinal position along the rotary cutting tool; and
    a cutting depth regulating structure operatively associated with said sleeve body and constructed and arranged to regulate the cutting depth of the cutting tip of the rotary cutting tool to which said depth stop is attached by arresting advancement of the rotary cutting tool into a work piece when said cutting depth regulating structure contacts the work piece into which the rotary cutting tool is cutting, said cutting depth regulating structure comprising a central hub portion defining a central aperture extending axially therethrough for selectively receiving the rotary cutting tool and a plurality of circumferentially spaced tines, each of said tines including a portion extending substantially parallel to the axis of rotation, toward the cutting tip of the rotary cutting tool.

2. A depth stop for selective attachment to a rotary cutting tool having an axis of rotation to regulate cutting depth of the rotary cutting tool, said depth stop comprising:
    a sleeve body having an aperture defined axially therethrough for selectively receiving the rotary cutting tool;
    a collet apparatus operatively engagable with said sleeve body to selectively detachably fix said sleeve body to the rotary cutting tool at a selected longitudinal position along the rotary cutting tool; and
    a cutting depth regulating structure operatively associated with said sleeve body and constructed and arranged to regulate the cutting depth of the rotary cutting tool to which said depth stop is attached by arresting advancement of the rotary cutting tool into a work piece when said cutting depth regulating structure contacts the work piece into which the rotary cutting tool is cutting,
    wherein said cutting depth regulating structure is rotatably coupled with said sleeve body so as to be rotatable with respect to the sleeve body about the axis of rotation, and
    wherein said cutting depth regulating structure has a central aperture defined axially therethrough for selectively receiving the rotary cutting tool, the cutting depth regulating structure including a central hub portion through which said central aperture is defined and a plurality of circumferentially spaced legs, each of said legs including a portion extending substantially in parallel to the axis of rotation of the rotary tool.

3. A rotary cutting tool adapted to be operatively coupled with a rotary tool turning machine and to form a circular hole of a preselected depth in a work piece when a cutting portion of said rotary cutting tool is engaged with the work piece while being turned by the rotary tool turning machine, said rotary cutting tool comprising:
    a boring tool having an elongated shank portion with a longitudinal axis of rotation and a cutting head disposed at one longitudinal end of said shank portion coaxially with the axis of rotation, said cutting head having an outside diameter greater than an outside diameter of said shank portion, said shank portion being constructed and arranged to be gripped and rotated by the rotary tool turning machine, said cutting head having cutting blades which cut the circular hole in the work piece when said cutting blades are engaged with the work piece while said boring tool is rotated by the rotary tool turning machine; and
    a depth stop for selective attachment to said boring tool to regulate cutting depth of said cutting blades to said preselected depth, said depth stop comprising:
        a sleeve body having an aperture defined axially therethrough for selectively receiving said shank portion;
        a sleeve body attaching mechanism operatively associated with said sleeve body and constructed and arranged to selectively detachably fix said sleeve body to said shank portion at a selected longitudinal position along said shank portion; and
        a cutting depth regulating structure operatively associated with said sleeve body and constructed and arranged to regulate the cutting depth of said cutting blades by arresting advancement of said cutting head into the work piece when said cutting depth regulating structure contacts the work piece into which said boring tool is cutting the circular hole, said cutting depth regulating structure having a central aperture defined axially therethrough for selectively receiving said shank portion and being rotatably coupled with said sleeve body so as to be rotatable with respect to said sleeve body about said axis of rotation so that when said cutting depth regulating structure contacts the work piece while said boring tool is being rotated by the rotary tool turning machine, said cutting depth regulating structure, in frictional contact with the surface of the work piece, stops rotating while said sleeve body and said boring tool continue to rotate with the rotary tool turning machine,
        wherein said cutting depth regulating structure of said depth stop includes a central hub portion through which said central aperture is defined and a plurality of circumferentially spaced legs, each of said legs including a portion extending substantially in parallel to the axis of rotation toward the cutting blades of said boring tool.

4. A rotary cutting tool adapted to be operatively coupled with a rotary tool turning machine and to form a circular hole of a preselected depth in a work piece when a cutting portion of said rotary cutting tool is engaged with the work piece while being turned by the rotary tool turning machine, said rotary cutting tool comprising:

a boring tool having an elongated shank portion with a longitudinal axis of rotation and a cutting head disposed at one longitudinal end of the shank portion coaxially with the axis of rotation, said cutting head having an outside diameter greater than an outside diameter of said shank portion, said shank portion being constructed and arranged to be gripped and rotated by the rotary tool turning machine, said cutting head having cutting blades which cut the circular hole in the work piece when said cutting blades are engaged with the work piece while said boring tool is rotated by the rotary tool turning machine; and a depth stop for selective attachment to said boring tool to regulate cutting depth of said cutting blades to said preselected depth, said depth stop comprising:

a sleeve body having an aperture defined axially therethrough for selectively receiving said shank portion;

a sleeve body attaching mechanism operatively associated with said sleeve body and constructed and arranged to selectively detachably fix said sleeve body to said shank portion at a selected longitudinal position along said shank portion; and a cutting depth regulating structure operatively associated with said sleeve body and constructed and arranged to regulate the cutting depth of said cutting blades by arresting advancement of said cutting head into the work piece when said cutting depth regulating structure contacts the work piece into which said boring tool is cutting the circular hole, said cutting depth regulating structure comprising a central hub portion having a central aperture defined axially therethrough for selectively receiving said shank portion and a plurality of circumferentially spaced tines, each of said tines including a portion extending substantially in parallel to the axis of rotation, toward said cutting blades of said boring tool.

5. A rotary cutting tool adapted to be operatively coupled with a rotary tool turning machine and to form a circular hole of a preselected depth in a work piece when said rotary cutting tool is engaged with the work piece while being turned by the rotary tool turning machine, said rotary cutting tool comprising:

a boring tool having an elongated shank portion with a longitudinal axis of rotation and a cutting head disposed at one longitudinal end of said shank portion coaxially with the axis of rotation, said cutting head having an outside diameter greater than an outside diameter of said shank portion, said shank portion being constructed and arranged to be gripped and rotated by the rotary tool turning machine, said cutting head having cutting blades which cut the circular hole in the work piece when the cutting blades are engaged with the work piece while the boring tool is rotated by the rotary tool turning machine; and a depth stop for selective attachment to said boring tool to regulate cutting depth of said cutting blades to said preselected depth, said depth stop comprising:

a sleeve body having an aperture defined axially therethrough for selectively receiving said shank portion;

a collet apparatus operatively engagable with said sleeve body to selectively detachably fix said sleeve body to said shank portion at a selected longitudinal position along said shank portion; and a cutting depth regulating structure operatively associated with said sleeve body and constructed and arranged to regulate the cutting depth of said cutting blades by arresting advancement of said cutting head into the work piece when said cutting depth regulating structure contacts the work piece into which said boring tool is cutting the circular hole;

wherein said cutting depth regulating structure is rotatably coupled with said sleeve body so as to be rotatable with respect to the sleeve body about the axis of rotation, and wherein said cutting depth regulating structure has a central aperture defined axially therethrough for selectively receiving the rotary cutting tool, the cutting depth regulating structure including a central hub portion through which said central aperture is defined and a plurality of circumferentially spaced legs, each of said legs including a portion extending substantially in parallel to the axis of rotation of the rotary tool.

6. The depth stop of claim 1 wherein said sleeve body attaching mechanism comprises a collet apparatus operatively engagable with said sleeve body.

7. The depth stop of claim 1 wherein said cutting depth regulating structure is rotatably coupled with said sleeve body so as to be rotatable with respect to the sleeve body about the axis of rotation.

8. The depth stop of claim 6 wherein said cutting depth regulating structure is rotatably coupled with said sleeve body so as to be rotatable with respect to the sleeve body about the axis of rotation.

9. The rotary cutting tool of claim 3 wherein said sleeve body attaching mechanism of said depth stop comprises a collet apparatus operatively engagable with said sleeve body.

10. The rotary cutting tool of claim 3 wherein said sleeve body attaching mechanism of said depth stop comprises a collet apparatus operatively engagable with said sleeve body.

11. The rotary cutting tool of claim 4 wherein said sleeve body attaching mechanism of said depth stop comprises a collet apparatus operatively engagable with said sleeve body.

12. The rotary cutting tool of claim 4 wherein said plurality of circumferentially spaced tines of said cutting depth regulating structure of said depth stop comprises three or more tines.

13. The rotary cutting tool of claim 3 wherein said cutting depth regulating structure of said depth stop is formed from a polymer having a low coefficient of friction.

14. The depth stop of claim 7 wherein said cutting depth regulating structure is formed from a polymer having a low coefficient of friction.

15. The depth stop of claim 2 wherein said cutting depth regulating structure is formed from a polymer having a low coefficient of friction.

16. The depth stop of claim 14 wherein said cutting depth regulating structure is formed from a polymer having a coefficient of friction in the range of 0.04 to 0.10.

17. The depth stop of claim 15 wherein said cutting depth regulating structure is formed from a polymer having a coefficient of friction in the range of 0.04 to 0.10.

18. The rotary cutting tool of claim 13 wherein said cutting depth regulating structure of said depth stop is formed from a polymer having a coefficient of friction in the range of 0.04 to 0.10.

19. The depth stop of claim 14 wherein said polymer is nylon.

20. The depth stop of claim 15 wherein said polymer is nylon.

21. The rotary cutting tool of claim 13 wherein said polymer is nylon.

22. A rotary cutting tool adapted to be operatively coupled with a rotary tool turning machine and to form a circular hole of a preselected depth in a work piece when a cutting portion of said rotary cutting tool is engaged with the work piece while being turned by the rotary tool turning machine, said rotary cutting tool comprising:

a boring tool having an elongated shank portion with a longitudinal axis of rotation and a cutting head disposed at one longitudinal end of said shank portion coaxially with the axis of rotation, said cutting head having an outside diameter greater than an outside diameter of said shank portion, said shank portion being constructed and arranged to be gripped and rotated by the rotary tool turning machine, said cutting head having cutting blades which cut the circular hole in the work piece when said cutting blades are engaged with the work piece while said boring tool is rotated by the rotary tool turning machine; and a depth stop for selective attachment to said boring tool to regulate cutting depth of said cutting blades to said preselected depth, said depth stop comprising:

a sleeve body having an aperture defined axially therethrough for selectively receiving said shank portion;

a sleeve body attaching mechanism operatively associated with said sleeve body and constructed and arranged to selectively detachably fix said sleeve body to said shank portion at a selected longitudinal position along said shank portion; and a cutting depth regulating structure operatively associated with said sleeve body and constructed and arranged to regulate the cutting depth of said cutting blades by arresting advancement of said cutting head into the work piece when said cutting depth regulating structure contacts the work piece into which said boring tool is cutting the circular hole, said cutting depth regulating structure having a central aperture defined axially therethrough for selectively receiving said shank portion and being rotatably coupled with said sleeve body so as to be rotatable with respect to said sleeve body about said axis of rotation so that when said cutting depth regulating structure contacts the work piece while said boring tool is being rotated by the rotary tool turning machine, said cutting depth regulating structure, in frictional contact with the surface of the work piece, stops rotating while said sleeve body and said boring tool continue to rotate with the rotary tool turning machine;

wherein said sleeve body of said depth stop defines an annular end face surrounding said aperture of said sleeve body and said cutting depth regulating structure is mounted to said sleeve body so as to cover at least a portion of said annular end face and said depth stop further includes an annular ring disposed between said cutting depth regulating structure and said annular end face.

23. The rotary cutting tool of claim 22 wherein said annular ring of said depth stop comprises a washer.

24. The rotary cutting tool of claim 23 wherein said washer is formed from a polymer having a low coefficient of friction.

25. The rotary cutting tool of claim 24 wherein said washer is formed from a polymer having a coefficient of friction in the range of 0.04 to 0.10.

26. The rotary cutting tool of claim 24 wherein said washer is nylon.

27. The depth stop of claim 7 wherein said sleeve body defines an annular end face surrounding said aperture of said sleeve body and said cutting depth regulating structure is mounted to said sleeve body so as to cover at least a portion of said annular end face and said depth stop further includes an annular ring disposed between said cutting depth regulating structure and said annular end face.

28. The depth stop of claim 27 wherein said annular ring of said depth stop comprises a washer.

29. The depth stop of claim 28 wherein said washer is formed from a polymer having a low coefficient of friction.

30. The depth stop of claim 28 wherein said washer is formed from a polymer having a coefficient of friction in the range of 0.04 to 0.10.

31. The depth stop of claim 28 wherein said washer is nylon.

32. The depth stop of claim 8 wherein said sleeve body defines an annular end face surrounding said aperture of said sleeve body and said cutting depth regulating structure is mounted to said sleeve body so as to cover at least a portion of said annular end face and said depth stop further includes an annular ring disposed between said cutting depth regulating structure and said end face.

33. A rotary cutting tool adapted to be operatively coupled with a rotary tool turning machine and to form a circular hole of a preselected depth in a work piece when a cutting portion of said rotary cutting tool is engaged with the work piece while being turned by the rotary tool turning machine, said rotary cutting tool comprising:

a boring tool having an elongated shank portion with a longitudinal axis of rotation and a cutting head disposed at one longitudinal end of said shank portion coaxially with the axis of rotation, said cutting head having an outside diameter greater than an outside diameter of said shank portion, said shank portion being constructed and arranged to be gripped and rotated by the rotary tool turning machine, said cutting head having cutting blades which cut the circular hole in the work piece when said cutting blades are engaged with the work piece while said boring tool is rotated by the rotary tool turning machine; and a depth stop for selective attachment to said boring tool to regulate cutting depth of said cutting blades to said preselected depth, said depth stop comprising:

a sleeve body having an aperture defined axially therethrough for selectively receiving said shank portion;

a sleeve body attaching mechanism operatively associated with said sleeve body and constructed and arranged to selectively detachably fix said sleeve body to said shank portion at a selected longitudinal position alone said shank portion; and a cutting depth regulating structure operatively associated with said sleeve body and constructed and arranged to regulate the cutting depth of said cutting blades by arresting advancement of said cutting head into the work piece when said cutting depth regulating structure contacts the work piece into which said boring tool is cutting the circular hole, said cutting depth regulating structure having a central aperture defined axially therethrough for selectively receiving said shank portion and being rotatably coupled with said sleeve body so as to be rotatable with respect to said sleeve body about said axis of rotation so that when said cutting depth regulating structure contacts the work piece while said boring tool is being rotated by the rotary tool turning machine, said cutting depth regulating structure, in frictional contact with the surface of the work piece, stops rotating while said sleeve body and said boring tool continue to rotate with the rotary tool turning machine;

wherein a one of said cutting depth regulating structure and said sleeve body of said depth stop has a circumferential groove formed on a periphery thereof and the other of said cutting depth regulating structure said groove to rotatable a peripheral flange disposed in said groove to rotatable mount said cutting depth regulating structure to said sleeve body.

34. The rotary cutting tool of claim 33 wherein said cutting depth regulating structure includes an upright cylindrical wall defining a cup structure for receiving a lower portion of said sleeve body and wherein said circumferential groove is formed about an outer periphery of said lower portion of said sleeve body and said peripheral flange is formed on an inner periphery of said upright cylindrical wall of said cutting depth regulating structure.

35. The rotary cutting tool of claim 34 wherein said flange is continuous.

36. The depth stop of claim 1 wherein said cutting tool is a boring tool having an elongated shank portion with an axis of rotation and a cutting head disposed at one end of said shank portion coaxially with said axis of rotation, said cutting head having an outside diameter greater than an outside diameter of said shank portion.

37. The depth stop of claim 2 wherein said cutting tool is a boring tool having an elongated shank portion with an axis of rotation and a cutting head disposed at one end of said shank portion coaxially with said axis of rotation, said cutting head having an outside diameter greater than an outside diameter of said shank portion.

38. The rotary cutting tool of claim 33 wherein said peripheral flange and said circumferential groove are formed so that said flange has a noninterfering fit within said groove so that when an axial force is applied to said cutting depth regulating structure toward said sleeve body, said flange does not contact side surfaces of said groove.

39. The depth stop of claim 2 wherein said sleeve body has exterior threads formed about an outer periphery thereof, said aperture of said sleeve body includes a tapered section, and said collet comprises:

a collet sleeve defining an axial aperture therethrough for selectively receiving the rotary cutting tool, said aperture defining a constant diameter along the axial extent thereof, a tapered outer surface defining a linearly increasing outer diameter from one axial end of said tapered outer surface to an opposite axial end of said tapered outer surface, and a longitudinal slot extending along the axial extent of said collet sleeve; and a collet cap having a radially extending annular wall defining a central aperture therethrough for selectively receiving the rotary cutting tool and an axial wall extending from said annular wall and having interior threads formed about an inner surface of said radial wall, wherein said collet sleeve, said collet cap, said aperture of said sleeve body, and the rotary cutting tool are disposed in a mutually coaxial arrangement and said collet sleeve is received within said aperture of said sleeve body with said tapered outer surface of said collet sleeve operatively engaged with said tapered portion of said aperture of said sleeve body and said collet cap is disposed over said collet sleeve with said interior threads of said collet cap operatively engaged with said exterior threads of said sleeve body and said annular wall of said collet cap in contact with an axial end of said collet sleeve extending from said aperture of said sleeve body so that as said collet cap is threaded onto said sleeve body, said collet sleeve is forced into said aperture of said sleeve body and the operative interengagment of said tapered outer surface of said collet sleeve with said tapered portion of said aperture of said sleeve body causes said collet sleeve to circumferentially contract around the rotary cutting tool received within the axial aperture of said collet sleeve.

40. The rotary cutting tool of claim 5 wherein said sleeve body has exterior threads formed about an outer periphery thereof, said aperture of said sleeve body includes a tapered section, and said collet comprises:

a collet sleeve defining an axial aperture therethrough for selectively receiving said shank portion of said boring tool, said aperture defining a constant diameter along the axial extent thereof, a tapered outer surface defining a linearly increasing outer diameter from one axial end of said tapered outer surface to an opposite axial end of said outer tapered surface, and a longitudinal slot extending along the axial extent of said collet sleeve; and a collet cap having a radially extending annular wall defining a central aperture therethrough for selectively receiving said shank portion and an axial wall extending from said annular wall and having interior threads formed about an inner surface of said radial wall, wherein said collet sleeve, said collet cap, said aperture of said sleeve body, and the rotary cutting tool are disposed in a mutually coaxial arrangement and said collet sleeve is received within said aperture of said sleeve body with said tapered outer surface of said collet sleeve operatively engaged with said tapered portion of said aperture of said sleeve body and said collet cap is disposed over said collet sleeve with said interior threads of said collet cap operatively engaged with said exterior threads of said sleeve body and said annular wall of said collet cap in contact with an axial end of said collet sleeve extending from said aperture of said sleeve body so that as said collet cap is threaded onto said sleeve body, said collet sleeve is forced into said aperture of said sleeve body and the operative interengagment of said tapered outer surface of said collet sleeve with said tapered portion of said aperture of said sleeve body causes said collet sleeve to circumferentially contract around the shank portion received within the axial aperture of said collet sleeve.

41. The depth stop of claim 1 wherein said plurality of circumferentially spaced tines comprises three or more tines.

42. The rotary cutting tool of claim 3 wherein said plurality of circumferentially spaced legs comprises three or more tines.

* * * * *